Figure 1:
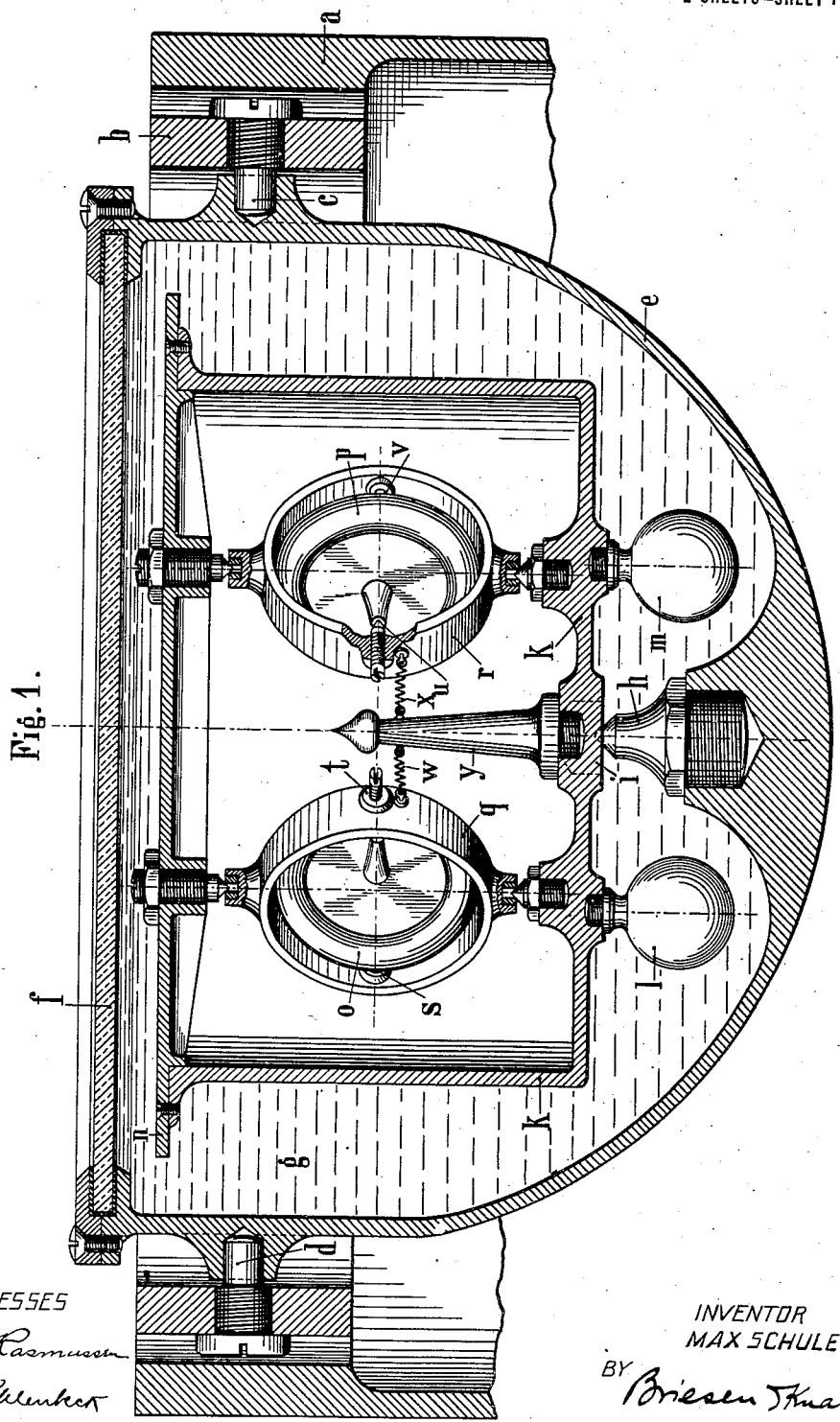

M. SCHULER.
GYROSCOPIC APPARATUS.
APPLICATION FILED JUNE 7, 1911.

1,186,339.

Patented June 6, 1916.
2 SHEETS—SHEET 1.

WITNESSES

INVENTOR
MAX SCHULER
BY
ATTORNEYS

M. SCHULER.
GYROSCOPIC APPARATUS.
APPLICATION FILED JUNE 7, 1911.

1,186,339.

Patented June 6, 1916.
2 SHEETS—SHEET 2.

WITNESSES
G. V. Rasmussen
John Attenberg

INVENTOR
MAX SCHULER
BY
Briesen & Knauth
ATTORNEYS

UNITED STATES PATENT OFFICE.

MAX SCHULER, OF NEUMÜHLEN, NEAR KIEL, GERMANY, ASSIGNOR TO ANSCHUTZ & CO., OF NEUMÜHLEN, NEAR KIEL, GERMANY.

GYROSCOPIC APPARATUS.

1,186,339.  Specification of Letters Patent.  Patented June 6, 1916.

Application filed June 7, 1911. Serial No. 631,698.

*To all whom it may concern:*

Be it known that I, MAX SCHULER, a subject of the Emperor of Germany, residing in Neumühlen, near Kiel, Germany, Heikendorfer Weg 9, have invented certain new and useful Improvements in or Relating to Gyroscopic Apparatus, of which the following is a specification.

When using gyroscopic apparatus, use is without exception made of the stability of the axis of rotation, or of the precession movements. There result, however, inaccuracies due to the failure to take into account the circumstance that the corresponding physical laws in their simplest form, are valid only for the gyroscope itself, that is to say, for a rotating body assumed to be independent of nonrotating masses, while in reality each gyroscope is connected to such masses, such as for instance, the casing, driving motor, suspension, etc. With these and similar appurtenances which all participate in the angular movements of the axis of the gyroscope, the latter forms a unit which will be designated hereinafter as a movable system. This movable system has definite moments of inertia. All turning moments at a right angle to the axis (*i. e.*, such moments as tend to displace said axis) of rotation are opposed by the deviation resistance of the gyroscope, while turning moments about the axis of rotation (*i. e.*, such as tend to rotate the movable system upon or around said axis) meet only the inertia resistance of the masses connected to the gyroscope. The movable system of a gyroscopic apparatus is thus similar to a body which has one comparatively very large, and a second comparatively very small, moment of inertia.

It is well known that bodies with unequal moments of inertia, when exposed to rhythmical vibrations, have the tendency to take up a definite position relatively to the plane of the vibrations. In accordance with that consideration gyroscopic apparatus are also influenced in quite a similar manner by rhythmic turning moments, in that they execute precession movements in definite direction to the plane of vibrations. These precession movements in all the cases where the direction of the axis of the gyroscope is to be observed or noted (especially true in the case of gyroscopic compasses), are very undesirable owing to the consequent disturbance of the results.

This invention relates to a device, by means of which the drawback mentioned is obviated, or at least considerably reduced. For such purpose, an additional single gyroscope (or more than one if preferred) is so attached to the movable system containing the usual or main gyroscope, as it may be termed, that the turning moment of said added gyroscope (or gyroscopes) opposes the turning moment of said usual or main gyroscope. In other words, the movable system, with respect to the rotation axis of said main gyroscope will be converted into a "gyroscopic pendulum" in the sense introduced by Föppl. In each plane the inertia resistance of one or more gyroscopes must be then overcome, whereby the period of oscillation is correspondingly increased. The system represents then in each plane a large "apparent mass." Theoretically, the influences of rhythmic turning moments on gyroscopic apparatus must disappear completely if not only the real, but also the apparent moments of inertia of the movable system become equal for each plane. It depends on the requirements of each case, how far it is desired to approach these ideal conditions.

An embodiment of the invention, applied to a gyroscopic compass, is hereinafter described and illustrated in the accompanying drawing.

Figure 2:
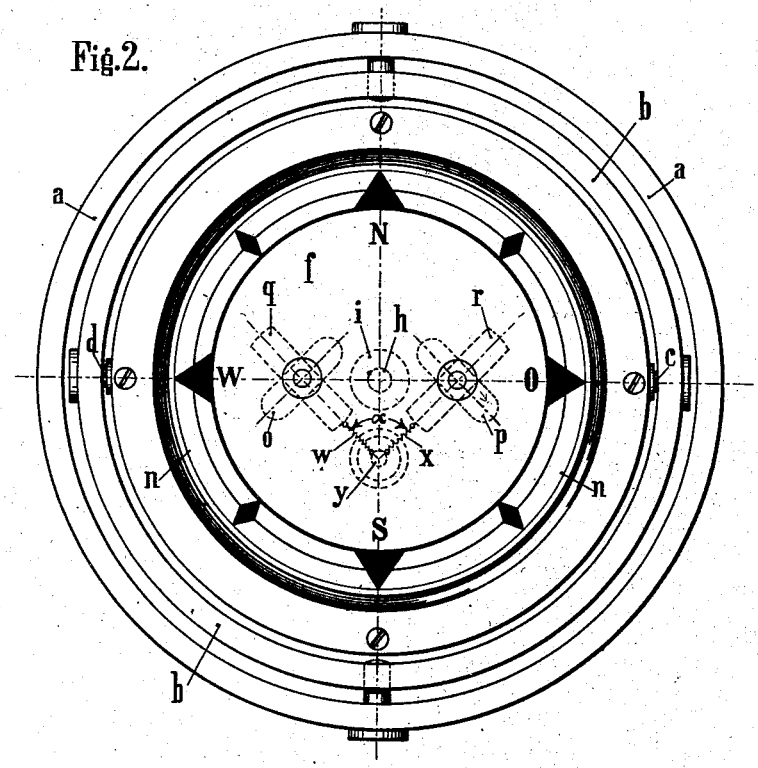
Figure 3:
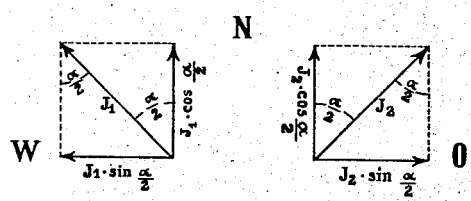
Figure 4:
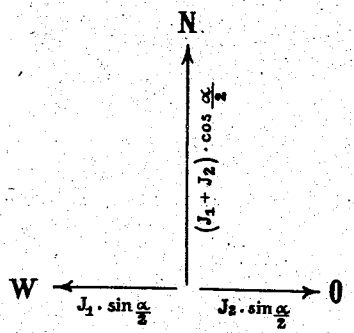

Figure 1 is a diagrammatic section. In order to make it clearer, the electric driving devices and conductors of the gyroscopic compass have been omitted in the drawings. Fig. 2 is a plan of the two gyroscopes, Figs. 3 and 4 are each a diagram of the impulse components of the gyroscopes.

In Fig. 1, $a$ is the compass casing, $b$ the gimbal ring, on which rests by means of knife edges $c$ and $d$ the bowl $e$. This bowl is covered in the well known manner by a glass disk $f$ and filled with a liquid $g$. In the bowl or vessel is secured the pin $h$ playing in the socket $i$ of the cylindrical float $k$. To the float are secured the weights $l$ and $m$ calculated in such manner that in the horizontal position illustrated, the center of gravity of the movable system is below its point of support, and so that only a small portion of the weight of the float rests on the pin $h$, while the main portion is supported by its buoyancy in the liquid.

In the interior of the float which carries at the top the card $n$, are arranged two gyroscopes $o$ and $p$, which may be spoken of respectively as the main and auxiliary gyroscopes the axes of which are at a given angle $a$ which in Figs. 1 and 2 is assumed to be 90° thereby stabilizing the movable system in the east and west plane. The spindles of the gyroscopes are mounted in rings $q$ and $r$ so as to rotate about $s-t$ and $u-v$, respectively, these rings being themselves rotatably mounted upon pivot points at top and bottom. The position of the rings $q$ and $r$ is determined by tension springs $w$ and $x$ each connected with one end to the rod $y$, and with the other end to the rings $q$ and $r$.

By this arrangement it is clear that the two gyroscopes will execute precession movements quite independently of one another as soon as, in consequence of any disturbance whatever, a turning moment is developed or introduced which tends to bring about a tipping inclination of the movable system in the east and west plane. According to well known laws of gyroscopic action the system will not at once respond to such turning moment; on the contrary, precession movements of the gyroscopic axes, corresponding to the direction of the turning moment, take place and thereby springs $w$ and $x$ are subjected to tension. The thus generated force brings about a raising of the gyroscopic axes and this, in its term, a turning moment which operates in the same direction as the original turning moment introduced by the disturbance in question, so that the movable system now assumes a slanting position with considerable delay, as respects the occurrence of the disturbance, the extent of the delay being essentially dependent upon the tension to which the springs are subjected.

If, instead of a single impulse or disturbance, there should occur rhythmical vibrations which are constantly changing in direction, then one can so choose the mentioned transient retardation that at least one change of direction will take place during its existence and hence only the integral of the individual impulses will come into action. The fact is to be emphasized that the rhythmical vibrations take effect at the center of gravity of the movable system which center of gravity, as previously stated, lies at a lower level than the supporting point.

The impulses of the two gyroscopes $o$ and $p$ can be resolved into two components, north-south and east-west, as is indicated by the four arrows in Fig. 3. The system as a whole is therefore, the equivalent of a combination of three gyroscopes whose impulses have the magnitudes indicated in Fig. 4. With respect to dynamical measurements and the influence of exterior forces, only the north-south impulses need be considered, since the two other impulses have opposite signs. On the other hand these two east-west impulses bring about the desired stabilization of the system with respect to the main north-south axis and, in this way, increase the apparent moment of inertia and the time of oscillation in the east-west plane. By correctly calculating the tension of the springs and of the angle, it is possible to fulfil the desired conditions.

The position of the rings $q$ and $r$ within the movable system can also be determined by other forces than those of the springs represented, as, for example, by the action of gravity.

It may be here pointed out that in the case of a rigid connection between the mounting of the gyroscope and the float, the desired gyroscopic pendulum effect will not obtain. The two gyroscopes will, in such case, behave as a single gyroscope. It is essential that the gyroscopes execute precession movements quite independently of one another and thereby put springs in tension, or bring other forces into play, which will call out the above referred to turning moments.

The present invention is distinguished from all so called stabilizing gyroscopes, which hitherto have been proposed for avoiding disturbing influences on gyroscopic apparatus, by the fundamental fact that it is not the suspension of the movable system which is to be stabilized but that all the gyroscopes constitute essential individual parts of the movable system. As a consequence the invention embraces all cases in which use is made of gyroscopic action in order, in accordance with the above explanation, to increase the apparent moment of inertia of the movable system of a gyroscope, or, in other words in order to stabilize, by means of one or more additional gyroscopes, the center of gravity (that is to say, the point at which gravitational forces act) in the vertical plane (east-west plane, where the rotation axis of the main gyroscope points toward the north, as is the case with a meridian gyroscope) lying at right angles to the rotation axis of the main gyroscope.

What I claim as my invention and pray to secure by Letters Patent is:—

1. A gyroscopic compass comprising a casing arranged to rotate upon a vertical axis, a plurality of rings attached to said casing and each arranged to rotate upon an axis parallel to said vertical axis, a gyroscope pivotally mounted in each ring the axes of the gyroscopes being perpendicular to the aforesaid vertical axis and at an angle with reference to one another, and a spring connecting each ring to the casing so as to keep the angle between the gyroscope axes normally constant.

2. A gyroscopic compass comprising a casing arranged to rotate upon a vertical axis, a plurality of rings attached to said casing and each arranged to rotate upon an axis parallel to said vertical axis, a gyroscope pivotally mounted in each ring the axes of the gyroscopes being perpendicular to the aforesaid vertical axis and at an angle with reference to one another, and a spring attached to said casing and to each gyroscope so as to normally cause the axis of said gyroscope to pass through the aforesaid vertical axis.

3. A gyroscope comprising a movable casing, a plurality of movably and independently mounted rings within said casing, a gyroscope pivotally mounted in each ring and resilient means connecting each ring to the movable casing, for the purpose described.

4. A gyroscope comprising a movable casing, a plurality of rings within said casing said rings being independently and rotatably attached to the casing by parallel diametral axes, a gyroscope pivotally mounted in each ring and resilient means connecting each ring to the movable casing for the purpose described.

5. A gyroscopic compass comprising a casing movable about a vertical axis, a plurality of gyroscopes having horizontal axes normally at an angle with reference to one another, and a ring in which each gyroscope axis is mounted each ring being attached to the casing and rotatable about a vertical axis.

In witness whereof I have hereunto signed my name this 18th day of May 1911 in the presence of two subscribing witnesses.

MAX SCHULER.

Witnesses:
JULIUS ROJIKE,
PAUL TOPPENDIECK.